Dec. 22, 1942. R. J. BAIR 2,306,326
DIRECTIONAL TURNING SIGNAL SWITCH
Filed Nov. 25, 1940 2 Sheets-Sheet 1
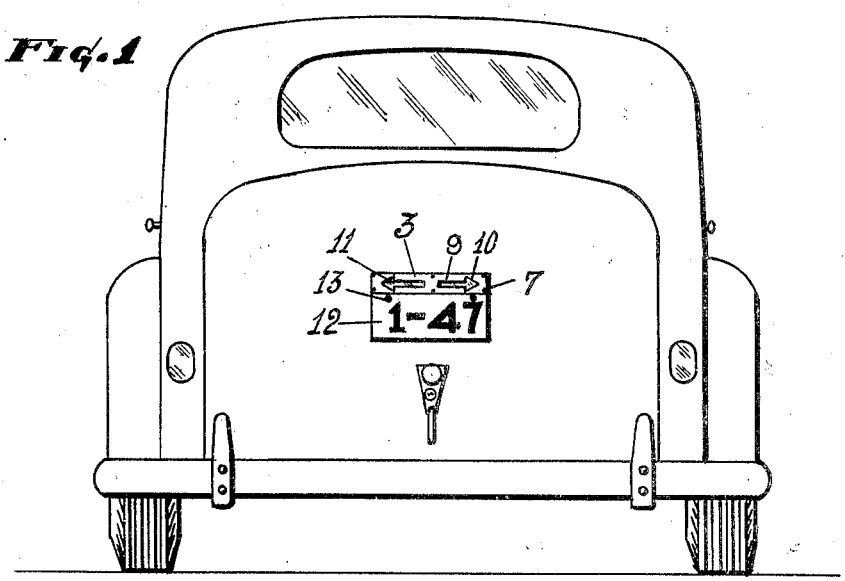
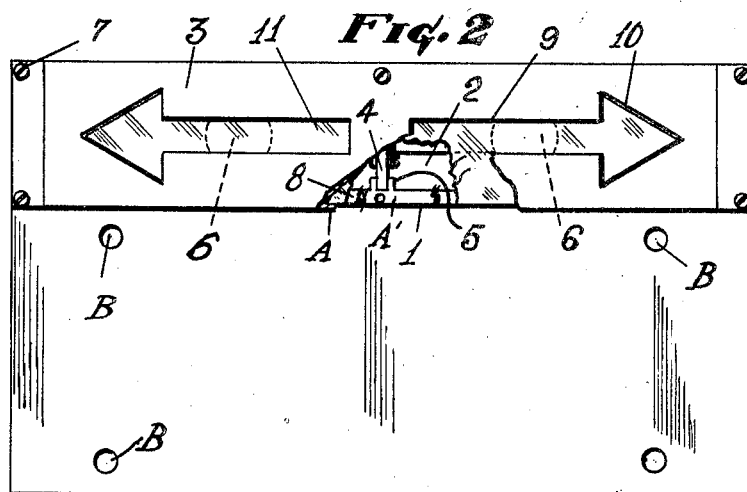
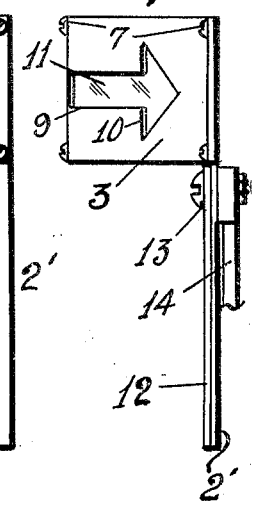
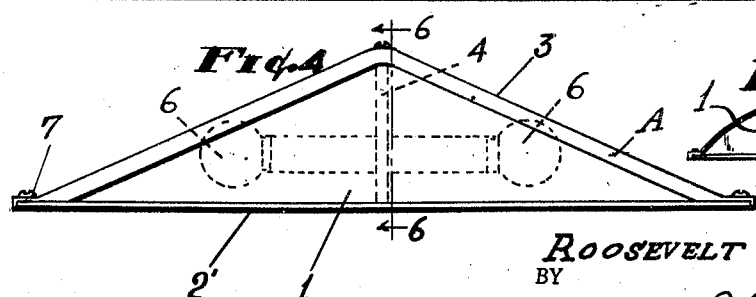
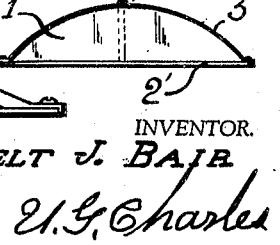
INVENTOR.
ROOSEVELT J. BAIR
BY
U. G. Charles Dec. 22, 1942.  R. J. BAIR  2,306,326
DIRECTIONAL TURNING SIGNAL SWITCH
Filed Nov. 25, 1940  2 Sheets-Sheet 2
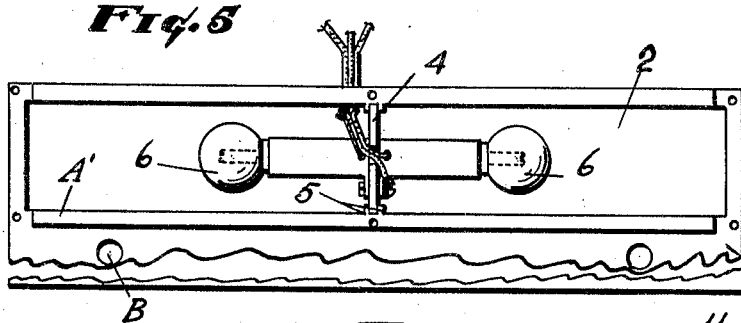
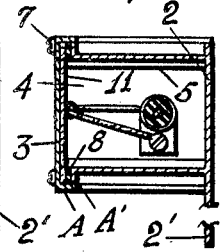
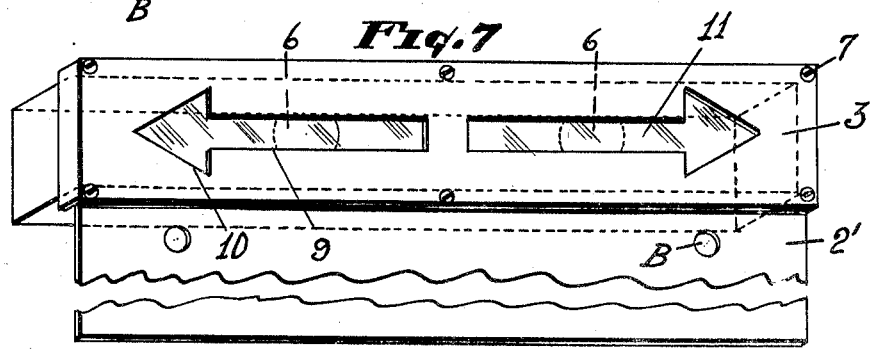
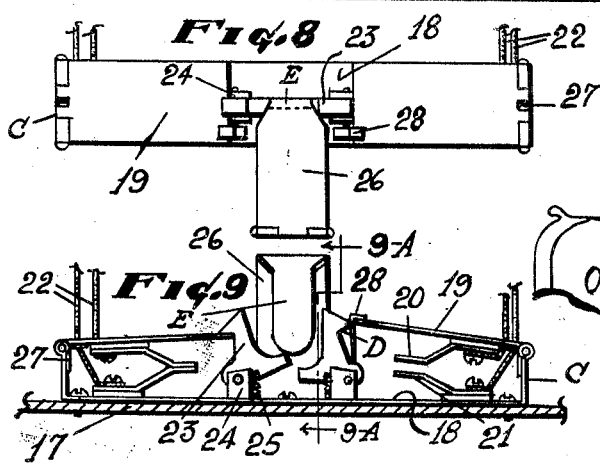
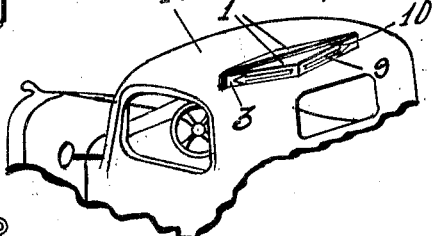
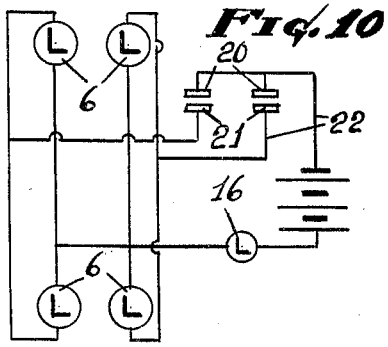
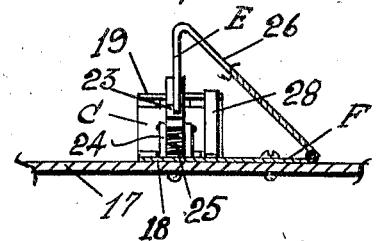
INVENTOR.
ROOSEVELT J. BAIR
BY Patented Dec. 22, 1942

2,306,326

UNITED STATES PATENT OFFICE 2,306,326

DIRECTIONAL TURNING SIGNAL SWITCH

Roosevelt J. Bair, Wichita, Kans.

Application November 25, 1940, Serial No. 367,027

2 Claims. (Cl. 200—59)

My invention relates to directional turning signals for motor vehicles, and has for its principal object the provision of a signal element, and hereinafter referred to as a unit to be applied to the body of a motor vehicle, or embodied in the construction of the body, and furthermore a signal visible from the sides as well as the ends of the vehicle.

A further object of my invention is to provide a signal having an opaque housing for the lamps and an opening formed by removing a portion of the housing shell to simulate an arrow in contour and through which light beams will appear when the signal lamps are energized.

A still further object of my invention is to provide a switch operative by the feet of the driver, the switch being positioned on the floor of the vehicle adjacent other controlling means for the vehicle.

A still further object of my invention is to provide a signal unit constructed in such a way that a pair thereof may be joined back to back, confronting rearward and forward, in which case, the unit will be positioned on the top of the vehicle body.

A still further object of my invention is to provide a lamp detector for the efficiency of the signal operation whereby an extinguished lamp that is inoperative may be detected by the driver as such detector lamp will be in view at all times.

A still further object of my invention is to provide means on the signal housing to connect the same to the license plate of the vehicle as the position of the plate is prominently in view of the other vehicles approaching the same.

Referring to the drawings:

Fig. 1 is a rear view of a motor vehicle, showing the signal carried by the license plate.

Fig. 2 is an enlarged front view of the signal arrangement, parts removed for convenience of illustration, and the license plate omitted.

Fig. 3 is an end view of Fig. 2, including the license plate and means of attachment.

Fig. 4 is an inverted view of Fig. 2.

Fig. 4A is a plan view of the housing modified by an arc for the signal front.

Fig. 5 is a front view having the arrow plate removed, and a portion of the supporting plate.

Fig. 6 is a sectional view taken on line 6—6 in Fig. 4.

Fig. 7 is a perspective view from the front, illustrating a rectangular housing for the signal.

Fig. 8 is a plan view of the switch mechanism.

Fig. 9 is a side view of Fig. 8, showing the floor board of the vehicle in section.

Fig. 9A is a sectional view taken on line 9A—9A in Fig. 9.

Fig. 10 is a wiring diagram for the signal arrangement.

Fig. 11 illustrates the signal as carried on the top of a truck cab.

My invention herein disclosed consists of a housing comprising upper and lower walls 1, a back 2 with its respective extension 2', and a signal plate 3, the housing being centrally divided by a partition 4 of insulation material, said partition being rectangular in form extending outward from the back, and slideably engaging in guides 5 that are secured to said upper and lower walls, whereby the partition is removable, and the said partition to function as carrying means for a pair of electric lamps 6 oppositely disposed as illuminating means for the interior of the housing, alternately and selectively with respect to their respective sides of the signal, and said lamps may be of the flash type for pulsative illumination as means to attract attention when the turning signal is energized.

It will be seen that the said signal plate 3 has a bend medially of its ends to seat on the outer end of the partition and obliquely extending rearward in straight alignment each way therefrom to where it meets the outer ends of the back, and being secured thereto by screws 7. Being so attached, the signal plate is removable as accessible means to the lamps, and the said plate having a flange A along its upper and lower edges extending at right angles to lappingly engage snugly over the outturned flange A' of the upper and lower walls of the housing as shown in Figs. 4 and 6, and made weather tight by a gasket 8 extending along the joint thus formed, the rear edges of said upper walls being integrally joined to the back by welding or otherwise. The said signal plate along each side from the partition has an opening cut therethrough, the contour of which simulates an arrow having a shaft 9 and a head 10, the arrows to point oppositely as shown in the drawings. The said signal plate has a translucent plate 11 to cover the interior thereof, the outer edges of which will fit snugly between the signal plate and said gasket, whereby it is supported snugly with the signal plate and to function as an enclosure for the arrow openings, said translucent plate having an appropriate color for signal purpose, and the form of the arrows being well defined when the lamps are energized, selectively. In other words, a right hand turn will be indicated, illuminating the arrow pointing the direction of such turn, and vice versa for a left hand turn.

As above described, the back of the signal has a downward extension, and being apertured adjacent its respective corners as at B, by which means a license plate 12 as shown in Fig. 1 lies on the front of the said extension, and secured thereto by bolts 13 extending through both said plates and a bracket 14 carried by the vehicle that may be conventional, and to which said license plate is attached, and in some events, the license plate is secured at its lower extremity, in which case the apertures at the lower corners of the extension will be engaged, and in either event, the said extension is a protection for the license plate, whether in the front or rear of the vehicle, as said signal is adaptable and will be placed at the front and rear of the vehicle.

In the event of adopting an elongated housing, rectangular in cross section as shown in Fig. 7, the extension is integral with the bottom of the housing positioned at right angles thereto, whereby the signal plate and the license plate are practically on the same vertical plane, it being understood that the signal plate having the arrows therein is in straight alignment longitudinally.

Furthermore, it will be seen in Fig. 11 that the signal may be placed on the cab top 15 of a truck, in which case the extension may be removed and a pair of the housings, as illustrated in Fig. 4, will be secured together back to back as visual means from the front, rear, and either side of the truck.

Fig. 10 discloses a wiring diagram showing the position of the lamps 6 for each front and rear signal housing, and also detector lamp 16 in series with the signal lamps, whereby a defective lamp will be detected by the driver of the vehicle, said lamp being preferably positioned on the instrument board.

There is also provided a switch mechanism separately operated to close the circuit for a left or right hand turn. The switch may be of conventional type and likewise carried at the instrument board or accessible to the driver and being operated by the hands.

Preferably, I have arranged a switch control positioned on the floor 17 of the vehicle to be operated by the foot, in which instance I have illustrated a mechanism as shown in Figs. 8, 9, and 9A, consisting of a floor plate 18 having a portion C at each end turned upward at right angle, and to which is hingedly attached a push plate 19 at each turned-up portion, the plate 19 having a contact member 20 secured to the underside thereof and rockably therewith, to be engaged by a contact member 21 rigidly secured to the floor plate, constituting a switch to make and break the current, each upper and lower contact member being connected through the medium of wires 22 extending to a source of current, and the said push plates are independently operated to make and break the current to control the right and left hand signals, selectively.

There is also provided a retainer for the closed circuit through the medium of a pawl 23 that is rockably connected between ears 24 that are secured to the floor plate, the pawl having a tooth D adjacent the upper end to engage the push plate when forced downward as shown in one side of the mechanism in Fig. 9, said pawl having a coil spring 25 to engage on its base to rock the pawl to engagement with the end of the push plate. There is also provided an extension at the base of the pawl to be engaged by a vertically disposed arm E of a foot lever 26 that is hingedly connected to the right angle extension F from the floor plate centrally thereof. The switch mechanism being so arranged, either side of the foot lever may be disengaged as the said arm will seat on either pawl extension when the circuit is closed, and the downward press of the foot lever is means to disengage a pawl from its locked position to break the circuit.

Each push plate has a legged spring 27 wound about its hinge pin, one leg bearing on the inner side of the up-turned portion, while the other leg engages on the under side of the push plate as raising means therefor. To restrict the upward movement, there is positioned at the free end of each plate an anchor bar 28 secured to the floor plate at its lower extremity, while the upper end has a right angle portion extending toward and over the plate to function as a stop in its upward movement as shown in Fig. 9 on the side where the contact elements are spaced apart.

It will be seen that a left hand turn signal is produced by compressing the left side push plate downward sufficient to engage the pawl, whereby the contact elements are brought to engagement, and vice versa, for a right hand turn, each pawl engagement being detached by compressing the said foot lever.

While I have shown and described the signal plate slanting in straight alignment each way from a common center, I do not wish to be restricted to such form, as such an angle may be substituted by an arc for the signal plate as shown in Fig. 4A; furthermore, the back plate extension may be varied by removing the major portion intermedially of the plate, whereby two apertured legs are formed as connecting means to the license plate arrangement to carry the signal, and such modifications may be made as lie within the scope of the appended claims.

Having fully described my invention what I claim as new and desire to secure by Letters Patent is:

1. In a control switch for a traffic signal device, the switch comprising a floor plate having ends and edges and being made of a single piece of material, a portion at each end of the plate being turned upward at right angles, and an electric contact member secured to the floor plate adjacent each upturned portion at each end of the plate, a push plate having one end hingedly connected to the upper end of each of the upturned portions, in such a way, that the free ends of the push plates extend toward each other, an electric contact member secured to each of said push plates and rockable therewith to engage and disengage with the first named electric contact member, a spring to rock said push plates upward, an anchor bar secured to the floor plate and upwardly extending in working relation to the free end of each push plate to restrict excess upward movement of said push plates, a pawl to engage the free end of each push plate when the latter is rocked downward to cause engagement of the switch elements to close its respective circuit selectively, and means to disengage each pawl as selectively engaged, each of said contact members being wired for their respective side of an electric circuit.

2. In a control switch for a traffic signal device, the switch comprising a floor plate of an appreciable length and means to secure said plate to the floor of a motor vehicle, an electric contact member secured to the plate adjacent each end thereof, and a plate rockably connected to each end of the floor plate, last said plates each carrying a similar electric contact member to that of the first named contact member to rock the same to and from engagement with each other, and a spring to rock the free end of each last said plates upward to disengage the contact members of the switch, a pawl rockably carried by the floor plate in working relation to the free end of each push plate, a lever hingedly connected to an element carried by the floor plate intermediate of its ends, the lever having means to disengage the pawls as selectively engaged when said lever is rocked by a press of a foot.

ROOSEVELT J. BAIR.